(12) United States Patent
Smith et al.

(10) Patent No.: US 10,793,297 B2
(45) Date of Patent: Oct. 6, 2020

(54) PASSIVE THERMAL SYSTEM COMPRISING COMBINED HEAT PIPE AND PHASE CHANGE MATERIAL AND SATELLITES INCORPORATING SAME

(71) Applicant: WorldVu Satellites Limited, Arlington, VA (US)

(72) Inventors: Alexander D. Smith, Algonquin, IL (US); Daniel W. Field, San Diego, CA (US); Armen Askijian, Sunnyvale, CA (US); James Grossman, Belmont, CA (US)

(73) Assignee: WORLDVU SATELLITES LIMITED, Arlington, VA (US)

( * ) Notice: Subject to any disclaimer, the term of this patent is extended or adjusted under 35 U.S.C. 154(b) by 248 days.

(21) Appl. No.: 15/870,642

(22) Filed: Jan. 12, 2018

(65) Prior Publication Data

US 2018/0134416 A1     May 17, 2018

Related U.S. Application Data

(63) Continuation of application No. 14/673,170, filed on Mar. 30, 2015, now Pat. No. 9,868,551.

(51) Int. Cl.
*B64G 1/50* (2006.01)
*F28D 15/04* (2006.01)
(Continued)

(52) U.S. Cl.
CPC ............ *B64G 1/50* (2013.01); *B64G 1/503* (2013.01); *B64G 1/506* (2013.01); *F28D 15/0275* (2013.01); *F28D 15/04* (2013.01); *F28D 15/043* (2013.01); *F28D 15/046* (2013.01); *F28D 20/02* (2013.01); *F28F 1/16* (2013.01); *F28F 1/422* (2013.01); *B64G 1/10* (2013.01); *B64G 1/26* (2013.01); *B64G 1/283* (2013.01);
(Continued)

(58) Field of Classification Search
CPC ...... F28D 15/04; F28D 15/043; F28D 15/046; B64G 1/50; B64G 1/503; B64G 1/506
See application file for complete search history.

(56) References Cited

U.S. PATENT DOCUMENTS

| 4,051,890 A | 10/1977 | Melchior |
| 4,200,148 A | 4/1980 | Friefeld et al. |

(Continued)

FOREIGN PATENT DOCUMENTS

EP     2439821 A1     4/2012

OTHER PUBLICATIONS

"Notice of Allowance" issued in parent U.S. Appl. No. 14/673,170, dated Sep. 15, 2017.
(Continued)

*Primary Examiner* — Jon T. Schermerhorn, Jr.
(74) *Attorney, Agent, or Firm* — Sughrue Mion, PLLC

(57) ABSTRACT

A passive thermal system for use in a satellite and other aerospace applications includes a container having a heat-pipe working fluid disposed in a first chamber and a Phase Change Material (PCM) disposed in a second chamber that substantially surrounds the first chamber. The first chamber contains a wick for transporting the heat-pipe working fluid. The exterior of the first chamber has fins, etc., that extend into the PCM for heat spreading and increased interface area.

20 Claims, 5 Drawing Sheets

(51) Int. Cl.
    *F28F 1/16*         (2006.01)
    *F28D 15/02*      (2006.01)
    *F28D 20/02*      (2006.01)
    *F28F 1/42*         (2006.01)
    *B64G 1/10*        (2006.01)
    *B64G 1/26*        (2006.01)
    *B64G 1/28*        (2006.01)
    *B64G 1/40*        (2006.01)
    *B64G 1/66*        (2006.01)
    *F28D 20/00*      (2006.01)
    *F28F 13/00*      (2006.01)

(52) U.S. Cl.
    CPC ................ *B64G 1/40* (2013.01); *B64G 1/402* (2013.01); *B64G 1/66* (2013.01); *F28D 2020/0013* (2013.01); *F28F 2013/006* (2013.01); *Y02E 60/145* (2013.01)

(56) References Cited

U.S. PATENT DOCUMENTS

| | | | |
|---|---|---|---|
| 5,069,274 A * | 12/1991 | Haslett | B64G 1/503 165/104.14 |
| 5,219,021 A * | 6/1993 | Edelstein | F28D 15/046 122/366 |
| 5,220,954 A | 6/1993 | Longardner et al. | |
| 6,631,755 B1 | 10/2003 | Kung et al. | |
| 7,513,462 B1 | 4/2009 | McKinnon et al. | |
| 9,046,305 B2 | 6/2015 | Chen | |
| 9,476,651 B2 * | 10/2016 | Thiagarajan | F28D 15/02 |
| 2003/0196778 A1 | 10/2003 | Kobayashi et al. | |
| 2006/0151145 A1 | 7/2006 | Chou et al. | |
| 2006/0151146 A1 | 7/2006 | Chou et al. | |
| 2006/0201656 A1 | 9/2006 | Lai et al. | |
| 2009/0242170 A1 | 10/2009 | Weber | |
| 2011/0044043 A1 | 2/2011 | Wong | |
| 2012/0085518 A1* | 4/2012 | Ichkahn | F28D 15/0275 165/104.26 |
| 2013/0233515 A1 | 9/2013 | Aston | |
| 2014/0083651 A1 | 3/2014 | Chaix et al. | |
| 2015/0060017 A1 | 3/2015 | Chung et al. | |

OTHER PUBLICATIONS

"Office Action" issued in parent U.S. Appl. No. 14/673,170, dated Jun. 9, 2016.
"Office Action" issued in parent U.S. Appl. No. 14/673,170, dated Sep. 16, 2016.
"Office Action" issued in parent U.S. Appl. No. 14/673,170, dated Apr. 20, 2017.
Authorized Officer: Lee W. Young, "International Search Report" dated Sep. 27, 2016 in Counterpart PCT Application No. PCT/US16/24922.
Authorized Officer: Lee W. Young, "Written Opinion of the International Searching Authority" dated Sep. 27, 2016 in Counterpart PCT Application:PCT/US16/24922.
L. Bledjian et al., "11 Phase-Change Materials", pp. 373-403, Publisher: The Aerospace Corporation, Lockheed Martin, Published in: California.
Arun Kumar et al., "Phase Change Materials (PCM) for Thermal Control During Spacecraft Transportation", 2013, vol. 3, No. 1, Publisher: International Journal of Mechanical and Industrial Engineering (IJMIE).
Zhao Xue (Dr), Written Opinion issued in Singapore patent application No. 11201708017T, dated Aug. 29, 2018.
Supplementary European search report received for EP Patent Application No. 16783558.6, dated Aug. 3, 2018, 2 pages.
European search opinion received for EP Patent Application No. 16783558.6, dated Aug. 3, 2018, 6 pages.

* cited by examiner

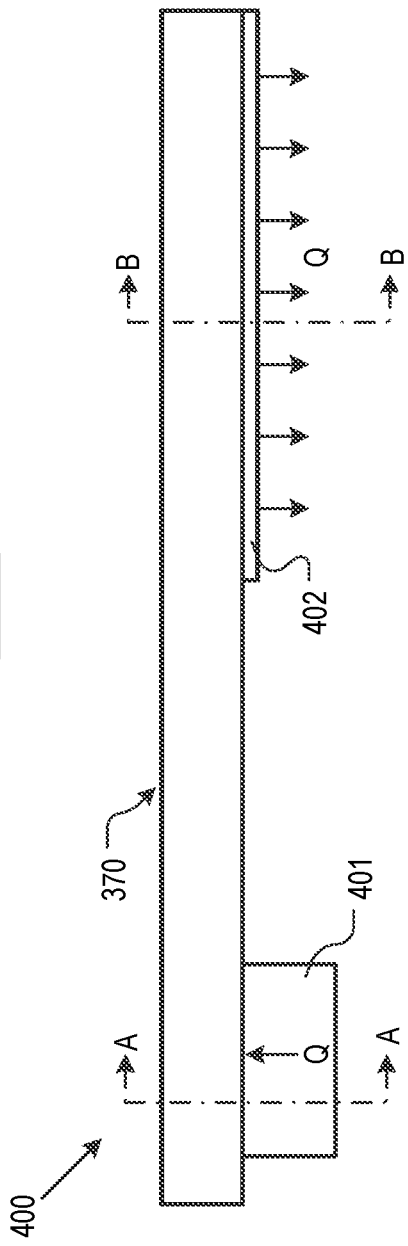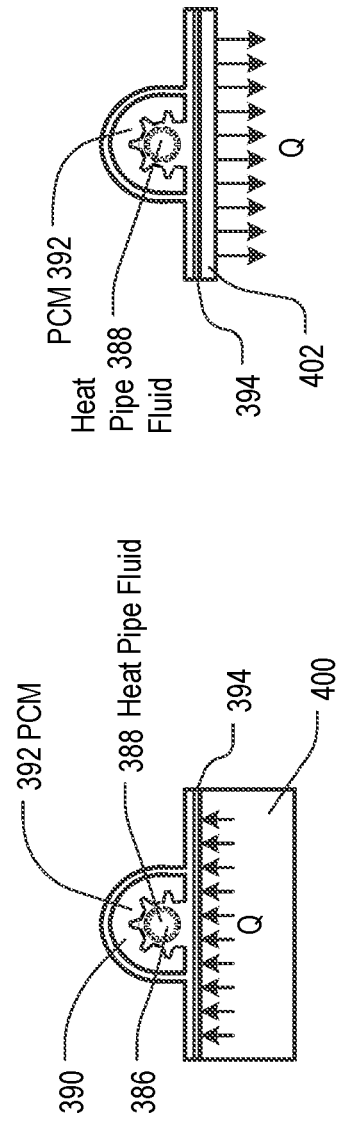
FIG. 4A
FIG. 4B
FIG. 4C

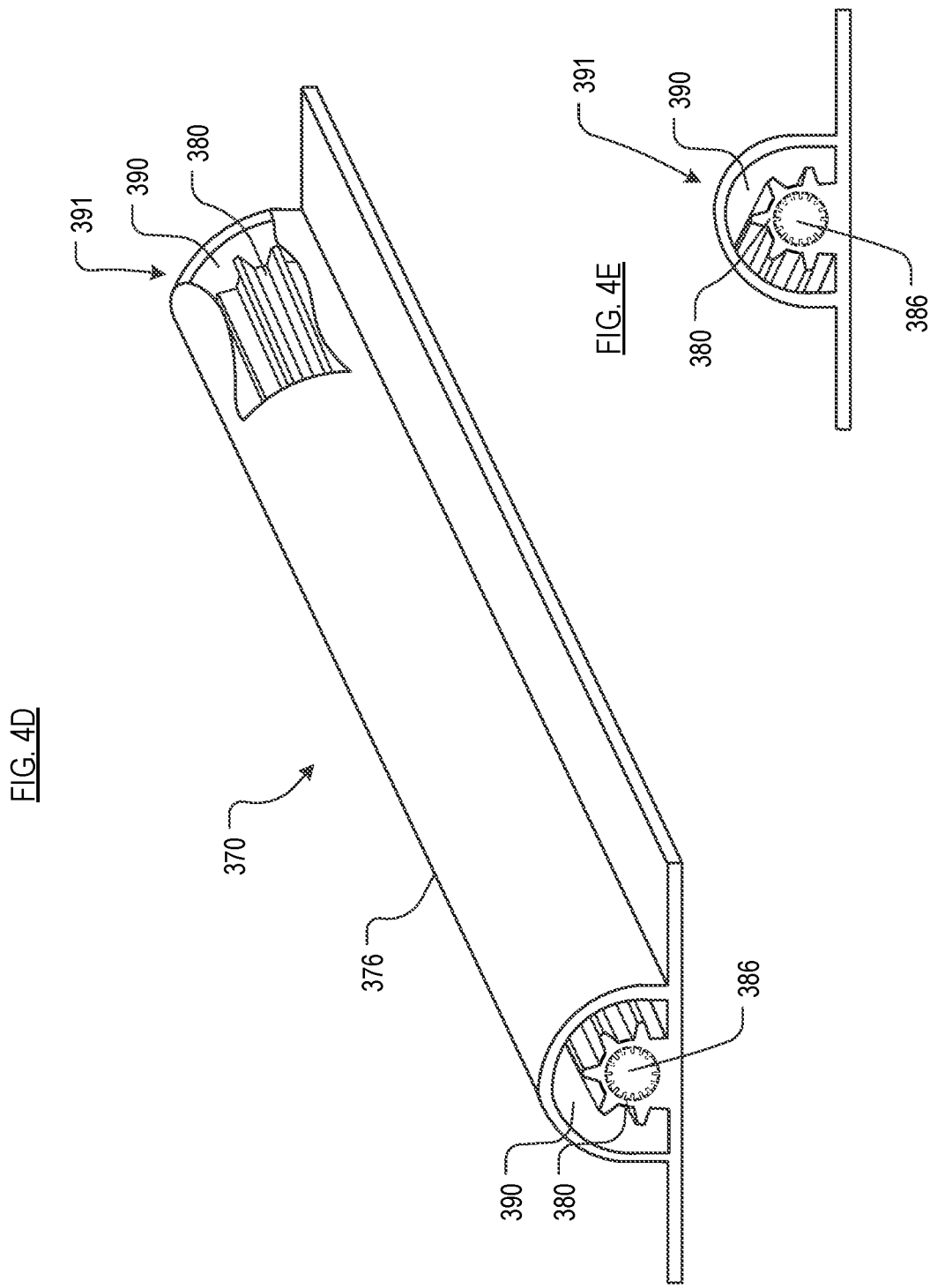

PASSIVE THERMAL SYSTEM COMPRISING COMBINED HEAT PIPE AND PHASE CHANGE MATERIAL AND SATELLITES INCORPORATING SAME

STATEMENT OF RELATED CASES

This case is a continuation of U.S. Pat. No. 9,868,551, issued Jan. 16, 2018.

FIELD OF THE INVENTION

The present invention relates to earth-orbiting communication satellites.

BACKGROUND OF THE INVENTION

Communication satellites receive and transmit radio signals from and to the surface of the Earth. Although Earth-orbiting communications satellites have been in use for many years, providing adequate cooling for the thermally sensitive electronics components onboard such satellites continues to be a problem.

There are two primary sources of heat with which a satellite's thermal systems must contend. One source is solar radiation. Solar radiation can be absorbed by thermal insulation shields or readily reflected away from the satellite by providing the satellite with a suitably reflective exterior surface. A second source of heat is the electronics onboard the satellite. The removal of electronics-generated heat is more problematic since such heat must be collected from various locations within the satellite, transported to a site at which it can be rejected from the satellite, and then radiated into space.

The smaller the satellite, the more problematic heat rejection can be. The limited size and mass of a smaller satellite naturally limits the surface area available for radiators and thermal control.

Heat pipes and phase change material ("PCM") are two technologies that are commonly used in satellites to address thermal issues. A heat pipe is a closed chamber, typically in the form of tube, having an internal capillary structure which is filled with a working fluid. The operating-temperature range of the satellite sets the choice of working fluid; ammonia, ethane and propylene are typical choices. Heat input (i.e., from heat-generating electronics) causes the working fluid to evaporate. The evaporated fluid carries the heat towards a colder heat-output section, where heat is rejected as the fluid condenses. The rejected heat is absorbed by the cooler surfaces of the heat-output section and then radiated into space. The condensate returns to the heat input section (near to heat-generating components) by capillary forces to complete the cycle.

A PCM is used to damp transient temperature extremes by storing heat when the thermal load is high and releasing heat when the thermal load is low. The PCM absorbs heat via the latent heat of fusion; that is the PCM melts. The heat is absorbed without an appreciable temperature rise. Conversely, a radiator, heat pipe, thermal strap, or other means is used to remove this absorbed heat, wherein the PCM refreezes.

PCM modules are typically mounted near or on a heat source of interest. The amount of the PCM module's surface area that is exposed to the heat source is maximized to the extent possible. Heat storage performance is directly related to the interface area for heat transfer and the depth of the PCM in the module. As necessary, heat pipes are mounted to the PCM modules and/or heat source to transport the heat to a heat sink (e.g., radiator, etc.).

SUMMARY OF THE INVENTION

The present invention provides an improved passive thermal system by combining a heat pipe with a PCM in a single housing. The passive thermal system is particularly adapted for use in satellites.

In accordance with the illustrative embodiment, a heat-pipe working fluid is disposed in a first chamber of container and a PCM is contained in a second chamber that substantially surrounds the first chamber. The first chamber contains a wick for heat transport, as per typical heat-pipe design. The exterior of the first chamber has fins, etc., that extend into the PCM for heat spreading and increased interface area.

This synthesis of heat pipe and PCM provides the following benefits: (i) the proximity of the PCM to the dissipation source is improved in most if not all situations, (ii) interface area is typically significantly improved utilizing the ability of the heat pipe to spread (transport) heat, and (iii) improves thermal coupling to the heat sink (e.g., radiator panel) by keeping the low thermal conductivity PCM out of the direct thermal path between the heat source (i.e., electrical component) and the heat sink.

Some embodiments in accordance with the present teachings provide: an apparatus comprising a passive thermal system, wherein the passive thermal system includes:
  housing, wherein the housing has an inner chamber and an outer chamber, wherein the outer chamber substantially surrounds the inner chamber;
  heat pipe working fluid, wherein the heat pipe working fluid is contained in the inner chamber; and
  phase change material (PCM), wherein the PCM is contained in the outer chamber.

Some embodiments in accordance with the present teaching provide: an apparatus comprising a passive thermal system, wherein the passive thermal system includes:
  heat pipe working fluid contained in an inner chamber; and
  phase change material (PCM) contained in the outer chamber, wherein the inner chamber and the outer chamber are arranged so that heat is transferred between the heat pipe working fluid and the PCM.

Some embodiments in accordance with the present teaching provide: a satellite comprising:
  a plurality of radiator panels that radiate heat to an external environment;
  a first plurality of electronics components that are contained in a second plurality of containers; and
  a passive thermal system, wherein the passive thermal system includes:
  (a) a housing, wherein the housing has an inner chamber and an outer chamber,
  (b) heat-pipe working fluid, wherein the heat pipe working fluid is contained in the inner chamber,
  (c) phase change material (PCM), wherein the PCM is contained in the outer chamber; and wherein:
    (i) one of the second plurality of containers is coupled to a first end of the passive thermal system; and
    (ii) one of the radiator panels is coupled to a second end of the passive thermal system.

BRIEF DESCRIPTION OF THE DRAWINGS

FIG. 4A depicts, via a side view, the improved passive thermal system of FIG. 3 in an arrangement for transferring heat from satellite electronics to a satellite radiator panel.

FIG. 4B depicts a cross-sectional view of the arrangement of FIG. 4A through the line A-A of FIG. 4A.

FIG. 4C depicts a cross-sectional view of the arrangement of FIG. 4A through the line B-B of FIG. 4A.

FIG. 4D depicts a partial cutaway, perspective view of the passive thermal system of FIGS. 3 and 4A-4C.

FIG. 4E depicts a cross-sectional view of end (391) of the passive thermal system of FIG. 4D.

DETAILED DESCRIPTION

Embodiments of the present invention can be used for all types of satellites (e.g., LEO, GEO, etc.). Before addressing the specifics of the instant passive thermal system, a satellite in which such a system can be used is described.

Figure 1:
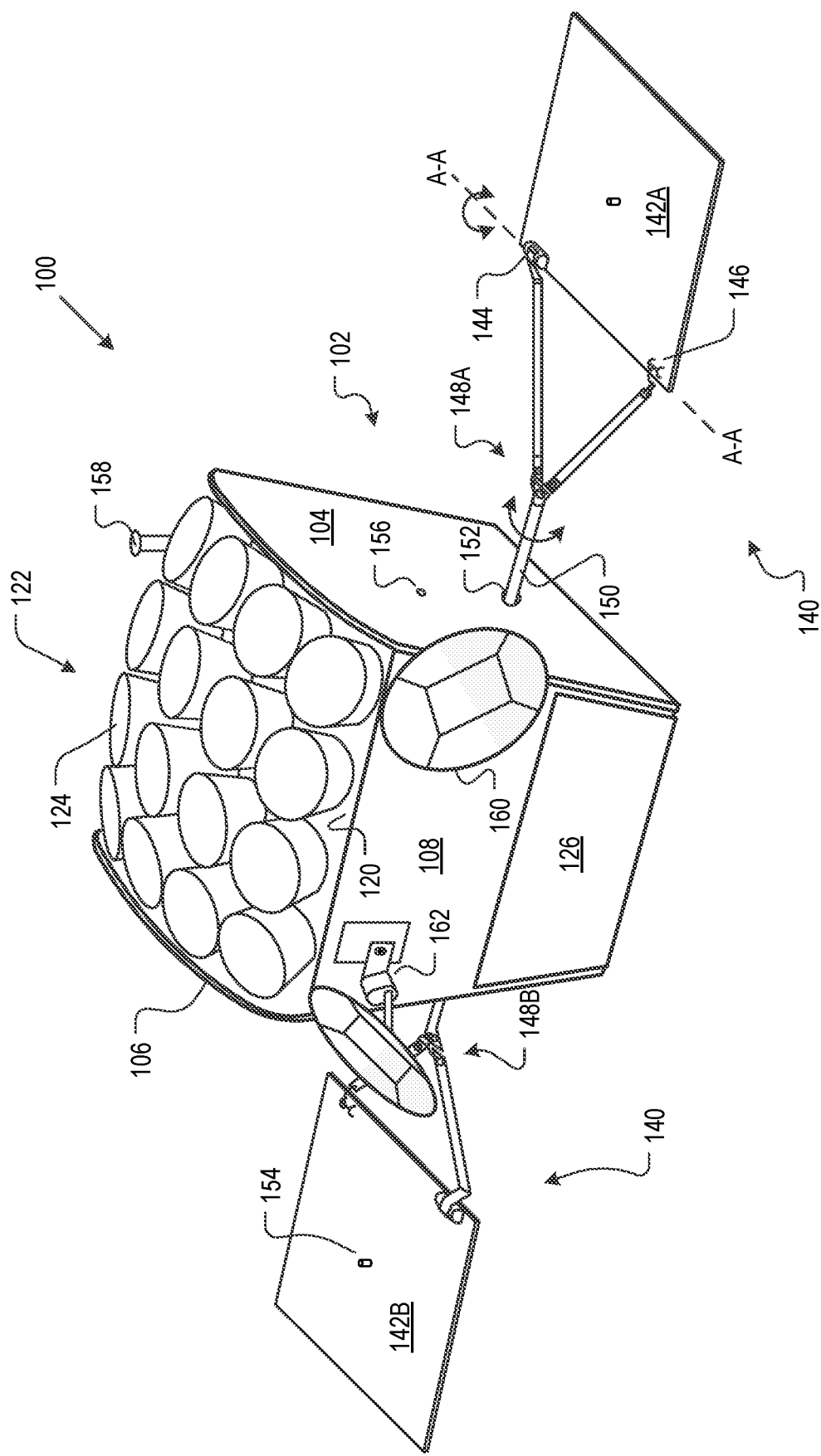
FIG. 1 depicts a satellite in accordance with the present teachings.
Figure 2:
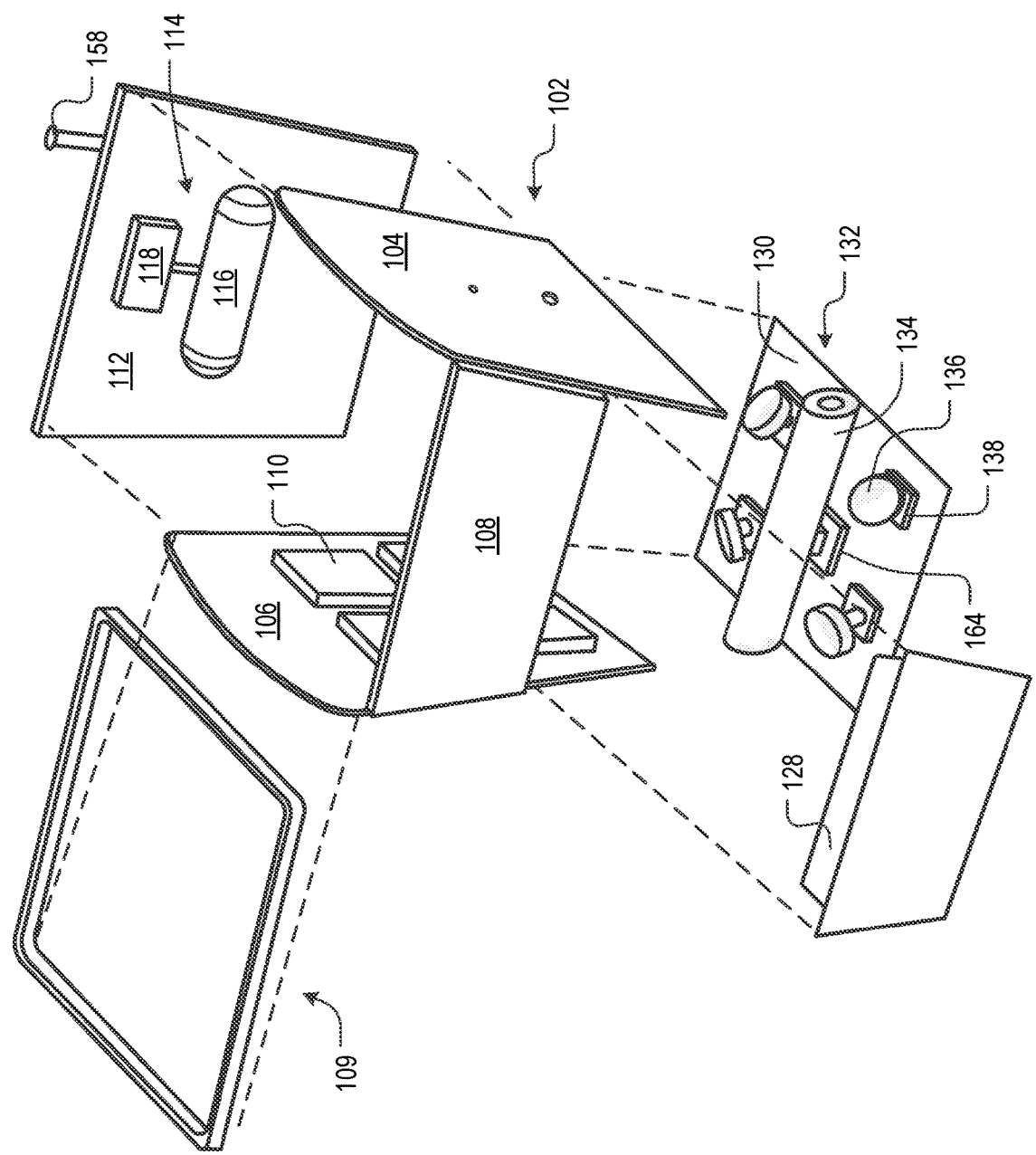
FIG. 2 depicts an exploded view of portions of the satellite of FIG. 1.

Satellite. FIG. 1 depicts satellite 100 in accordance with the present teachings. FIG. 2 depicts an "exploded" view of some of the salient features of satellite 100. Referring now to both FIGS. 1 and 2, satellite 100 includes unified payload module 102, propulsion module 114, payload antenna module 122, bus component module 132, and solar-array system 140, arranged as shown. It is to be noted that the orientation of satellite 100 in FIGS. 1 and 2 is "upside down" in the sense that in use, antennas 124, which are facing "up" in the figures, would be facing "down" toward Earth.

Unified payload module 102 comprises panels 104, 106, and 108. In some embodiments, the panels are joined together using various connectors, etc., in known fashion. Brace 109 provides structural reinforcement for the connected panels.

Panels 104, 106, and 108 serve, among any other functionality, as radiators to radiate heat from satellite 102. In some embodiments, the panels include adaptations to facilitate heat removal. In some embodiments, the panels comprise plural materials, such as a core that is sandwiched by face sheets. Materials suitable for use for the panels include those typically used in the aerospace industry. For example, in some embodiments, the core comprises a lightweight aluminum honeycomb and the face sheets comprise 6061-T6 aluminum.

Propulsion module 114 is disposed on panel 112, which, in some embodiments, is constructed in like manner as panels 104, 106, and 108 (e.g., aluminum honeycomb core and aluminum facesheets, etc.). Panel 112, which is obscured in FIG. 1, abuts panels 104 and 106 of unified payload module 102.

Propulsion module 114 includes fuel tank 116 and propulsion control system 118. The propulsion control system controls, using one or more valves (not depicted), release of propulsion gas through the propulsion nozzle (not depicted) that is disposed on the outward-facing surface of panel 114. Propulsion control system is appropriately instrumented (i.e., software and hardware) to respond to ground-based commands or commands generated onboard from the control processor.

Payload antenna module 122 comprises a plurality of antennas 124. In the illustrative embodiments, sixteen antennas 124 are arranged in a 4×4 array. In some other embodiments, antennas 124 can be organized in a different arrangement and/or a different number of antennas can be used. Antennas 124 are supported by support web 120. In some embodiments, the support web is a curved panel comprising carbon fiber, with a suitable number of openings (i.e., sixteen in the illustrative embodiment) for receiving and supporting antennas 124.

In some embodiments, antennas 124 transmit in the $K_u$ band, which is the 12 to 18 GHz portion of the electromagnetic spectrum. In the illustrative embodiment, antennas 124 are configured as exponential horns, which are often used for communications satellites. Well known in the art, the horn antenna transmits radio waves from (or collects them into) a waveguide, typically implemented as a short rectangular or cylindrical metal tube, which is closed at one end and flares into an open-ended horn (conical shaped in the illustrative embodiment) at the other end. The waveguide portion of each antenna 124 is obscured in FIG. 1. The closed end of each antenna 124 couples to amplifier(s) (not depicted in FIGS. 1 and 2; they are located on the interior surface of panel 104 or 108).

Bus component module 132 is disposed on panel 130, which attaches to the bottom (from the perspective of FIGS. 1 and 2) of the unified payload module 102. Panel 130 can be constructed in like manner as panels 104, 106, and 108 (e.g., aluminum honeycomb core and aluminum facesheets, etc.). In some embodiments, panel 130 does not include any specific adaptations for heat removal.

Module 132 includes main solar-array motor 134, four reaction wheels 136, and main control processor 164. The reaction wheels enable satellite 100 to rotate in space without using propellant, via conservation of angular momentum. Each reaction wheel 136, which includes a centrifugal mass (not depicted), is driven by an associated drive motor (and control electronics) 138. As will be appreciated by those skilled in the art, only three reaction wheels 136 are required to rotate satellite 100 in the x, y, and z directions. The fourth reaction wheel serves as a spare. Such reaction wheels are typically used for this purpose in satellites.

Main control processor 164 processes commands received from the ground and performs, autonomously, many of the functions of satellite 100, including without limitation, attitude pointing control, propulsion control, and power system control.

Solar-array system 140 includes solar panels 142A and 142B and respective γ-bars 148A and 148B. Each solar panel comprises a plurality of solar cells (not depicted; they are disposed on the obscured side of solar panels 142A and 142B) that convert sunlight into electrical energy in known fashion. Each of the solar panels includes motor 144 and passive rotary bearing 146; one of the γ-bar attaches to each solar panel at motor 144 and bearing 146. Motors 144 enable each of the solar panels to at least partially rotate about axis A-A. This facilitates deploying solar panel 142A from its stowed position parallel to and against panel 104 and deploying solar panel 142B from its stowed position parallel to and against panel 106. The motors 144 also function to appropriately angle panels 142A and 142B for optimal sun exposure via the aforementioned rotation about axis A-A.

Member 150 of each y-bar 148A and 148B extends through opening 152 in respective panels 104 and 106. Within unified payload module 102, members 150 connect to main solar-array motor 134, previously referenced in conjunction with bus component module 132. The main solar-array motor is capable of at least partially rotating each member 150 about its axis, as shown. This is for the purpose of angling solar panels 142A and 142B for optimal sun exposure. In some embodiments, the members 150 can be rotated independently of one another; in some other embodiments, members 150 rotate together. Lock-and-release member 154 is used to couple and release solar panel 142A to side panel 104 and solar panel 142B to side panel 106. The lock-and-release member couples to opening 156 in side panels 104 and 106.

Satellite 100 also includes panel 126, which fits "below" (from the perspective of FIGS. 1 and 2) panel 108 of unified payload module 102. In some embodiments, panel 108 is a sheet of aerospace grade material (e.g., 6061-T6 aluminum, etc.) Battery module 128 is disposed on the interior-facing surface of panel 126. The battery module supplies power for various energy consumers onboard satellite 100. Battery module 128 is recharged from electricity that is generated via solar panels 142A and 142B; the panels and module 128 are electrically coupled for this purpose (the electrical path between solar panels 142A/B and battery module 128 is not depicted in FIGS. 1 and 2).

Satellite 100 further includes omni-directional antenna 158 for telemetry and ground-based command and control.

Disposed on panel 108 are two "gateway" antennas 160. The gateway antennas send and receive user data to gateway stations on Earth. The gateway stations are in communication with the Internet. Antennas 160 are coupled to panel 108 by movable mounts 162, which enable the antennas to be moved along two axes for optimum positioning with ground-based antennas. Antennas 160 typically transmit and receive in the $K_a$ band, which covers frequencies in the range of 26.5 to 40 GHz.

Convertor modules 110, which are disposed on interior-facing surface of panel 106, convert between $K_a$ radio frequencies and $K_u$ radio frequencies. For example, convertor modules 110 convert the $K_a$ band uplink signals from gateway antennas 160 to $K_u$ band signals for downlink via antennas 124. Convertor modules 110 also convert in the reverse direction; that is, $K_u$ to $K_a$.

In operation of satellite 100, data flows as follows for a data request:
(obtain data): requested data is obtained from the Internet at a gateway station;
(uplink): a data signal is transmitted ($K_a$ band) via large, ground-based antennas to the satellite's gateway antennas 160;
(payload): the data signal is amplified, routed to convertor modules 110 for conversion to downlink ($K_u$) band, and then amplified again;
the payload signal is routed to payload antennas 124;
(downlink): antennas 124 transmit the amplified, frequency-converted signal to the user's terminal.

When a user transmits (rather than requests) data, such as an e-mail, the signal follows the same path but in the reverse direction.

Passive Thermal System.

Figure 3:
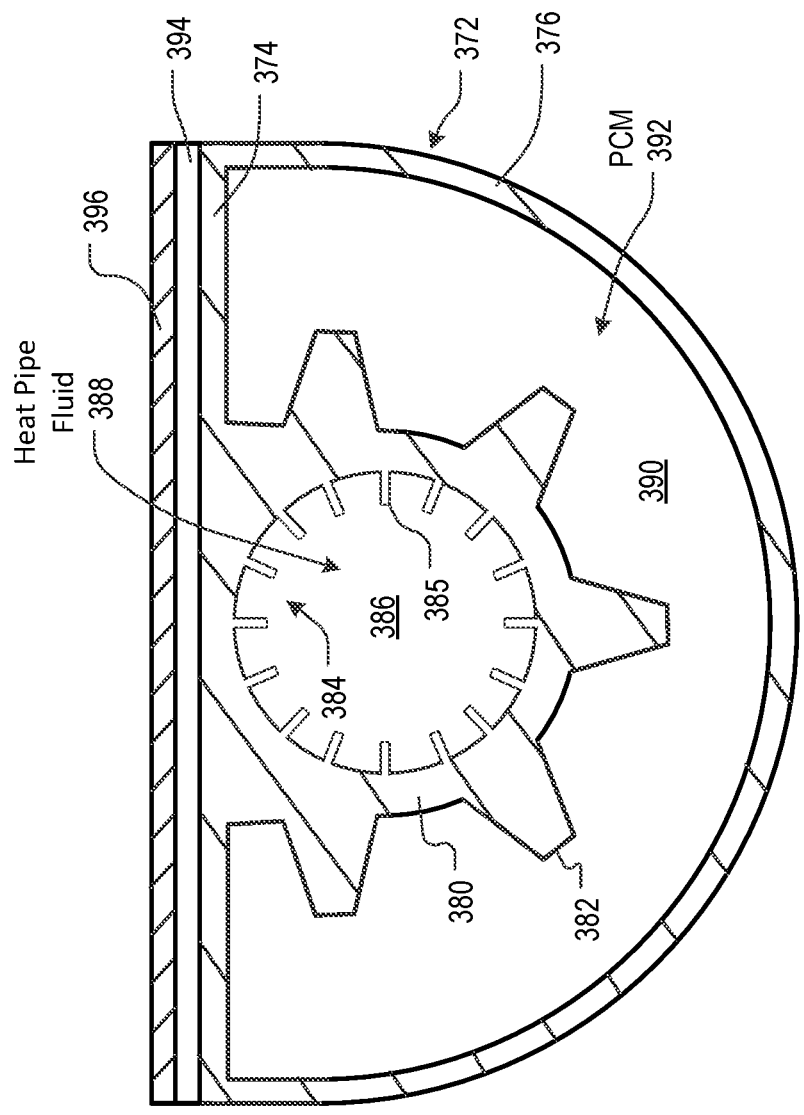
FIG. 3 depicts an improved passive thermal system for use in conjunction with the satellite of FIGS. 1 and 2, in accordance with the illustrative embodiment of the present invention.

FIG. 3 depicts a cross-sectional view of passive thermal system 370.

Passive thermal system 370 comprises housing 372, which, in the illustrative embodiment, includes wall 374 and wall 376. Wall 374 is dimensioned and shaped to couple to heat sink/source 396. In the illustrative embodiment, heat sink/source 396 is a radiator panel, such as radiator panels 104, 106, 108, 112, etc. As a consequence, heat sink/source 396 is functioning as a heat sink. Also, since radiator panels are relatively flat, wall 374 is flat as well.

Internal wall 380 extends from wall 374 towards wall 376. Wall 380 has a curved shape that generally mirrors the shape of wall 376. Outer chamber 390 is defined between wall 376, wall 390, and portions of wall 374. Inner chamber 386 is defined within wall 380.

Heat pipe fluid 388 is contained in inner chamber 386. Typical heat pipe fluids include ammonia, ethane, propylene, etc. The phrase "heat pipe fluid" is defined for use in this disclosure and the appended claims to mean a fluid that, under the conditions of its use, is intended to change phase between a liquid and a vapor. As is well known to those skilled in the art, heat pipes include a wick structure, the purpose of which is move, via capillary action, the heat pipe fluid (when in liquid form) through the length of the heat pipe. Wick structure 384, which is disposed in inner chamber 386, is used for the same purpose. In the illustrative embodiment, wick structure 384 comprises a plurality of projections 385 extending inwardly from wall 380. The projections extend the length of inner chamber 386. A variety of wick designs are known in the art and any of such designs may suitably be used in conjunction with the present invention.

PCM or phase change material 392 is contained in outer chamber 390. The term "PCM" is defined for use in this disclosure and the appended claims to mean a fluid that, under the conditions of its use, is intended to change phase between a solid and a liquid. Any of a variety of materials can be used as PCM 392, as is appropriate for the heat load and materials of construction. Typical materials suitable for use as PCM 392 include paraffin or salt hydrate. Fins 382, which extend outwardly from wall 380, project into outer chamber 390 and into PCM 392. The purpose of fins 382 is to increase the heat transfer surface of wall 380 to maximize, to the extent possible, the surface area of the interface between wall 380/fins 382 and PCM 392.

Because PCM 392 is a (very) high viscosity fluid, the heat it receives (from wall 380/fins 382) will not transfer well therein. As a consequence, there will be a smaller temperature gradient over the length of the fin and between the fin and immediately surrounding PCM 392. It will therefore be important to taper fins 382 such that they are thicker at their base (nearest wall 380) than at their tip. This will help to maintain a temperature gradient across fins 382 (because with relatively less mass at the tip than at the base, the tip will cool more quickly than a relatively thicker one). In light of the present disclosure, those skilled in the art will be able to design and build fins 382 suitable for their intended purpose, as discussed above.

It is desirable to minimize the temperature gradient in PCM 392 between the exterior surface of wall 380 and the interior surface of wall 376. For the reasons previously discussed, fins 382 should therefore extend well into outer chamber 392. Based on various considerations, in some embodiments, fins 382 extend 40% or more of the distance between exterior surface of wall 380 and interior surface of wall 376. In some other embodiments, fins 382 extend 45% or more of the distance between exterior surface of wall 380 and interior surface of wall 376. And in some yet further embodiments, fins 382 extend 50% or more of the distance between exterior surface of wall 380 and interior surface of wall 376.

Housing 372 is coupled to the heat source/heat sink 396 via interface material 394. The primary function of interface material 394 is to minimize, to the extent possible, the thermal resistance between housing 372 and heat source/heat sink 396. As a consequence, the interface material should be characterized by a high thermal conductivity, an ability to form a thin bond line, and little or no tendency to form voids over the operating life. With respect to "high" thermal conductivity, a heat transfer coefficient greater than about 500 W/(m²K) is desirable. Although the coupling between housing 372 and heat source/heat sink 396 can be supplemented by mechanical fasteners, it is important for interface material 394 to adhere well (e.g., even contact, no voiding, etc.) to both coupled surfaces to keep thermal resistance as low as practical.

In some embodiments, interface material 394 is room temperature vulcanized silicone (RTV). Other suitable materials for use as interface material 394 include, without limitation, pressure-sensitive adhesives, film adhesives, gaskets, and epoxy. Of course, interface material 394 must be compatible with the material of construction of heat source/heat sink 396 and housing 372. In the illustrative embodiment, heat source/heat sink 396 is a radiator panel, which is typically formed of aluminum, and housing 372 comprises aluminum, which is typically compatible with the candidate interface materials mentioned above.

FIG. 4A depicts, via a side view, arrangement 400 wherein passive thermal system 370 is configured to transfer heat from satellite electronics 401 to satellite radiator panel 402. FIG. 4B depicts a cross-sectional view of the arrangement of FIG. 4A through the line A-A and FIG. 4C depicts a cross-sectional view of the arrangement of FIG. 4A through the line B-B. FIG. 4D depicts a partial cutaway, perspective view of passive thermal system 370. FIG. 4E depicts a cross section of FIG. 4D at end 391.

Satellite electronics 401 is representative of any of a number of different electronics systems that are onboard satellite 100 for various purposes. All such electronics typically generate heat that needs to be expelled from the satellite. Satellite radiator panel 402 is representative of radiator panels 104, 106, 108, 112, etc., of satellite 100, as shown in FIGS. 1 and 2, which can be used to expel the heat generated by satellite electronics 401.

As depicted in FIG. 4A, satellite electronics 401 is disposed near a first end of passive thermal system 370 and radiator panel 402 is disposed near a second end thereof. Passive thermal system 370 is coupled to satellite electronics 401 and radiator panel 402 via interface material 394, previously discussed (see FIG. 3 and also FIGS. 4B, and 4C). Satellite electronics 401 generates heat, Q, which is collected and transported by passive thermal system 370 to radiator 402, where heat Q is rejected to space.

Passive thermal system 370 operates as follows. Heat pipe fluid 388 collects the heat generated from satellite electronics 401. Fluid 388 is selected such that it evaporates at a very low temperature. For example, saturated ammonia, which is a typical heat pipe material, evaporates at −33° C. PCM 392 typically undergoes phase change (liquid/solid) at a considerably higher temperature, usually in the range of about 20 to 60° C. as a function of the material. As a consequence, most of the heat, Q, collected by passive thermal system 370 transfers to heat pipe fluid 388 in inner chamber 386. Heat pipe fluid immediately begins to evaporate, transferring heat across inner chamber 386 at near sonic speed. In practice, inner chamber 386 can be considered an isothermal environment because heat transfer is so effective and fast in this temperature range.

The effect of this rapid heat transfer is to increase the surface area term, A, in the thermal conductance expression [1] between heat pipe fluid 388 in inner chamber 386 and PCM 392 in outer chamber 390:

$$G = h \times A \qquad (1)$$

where: G is the thermal conductance;
  h is the heat transfer coefficient; and
  A is the contact area.

When thermal conductance, G, is large, heat transfers more readily into PCM 392, such that the PCM is more effective and permitting a larger quantity PCM to be available for use.

It is notable that some heat transfers directly into the PCM from the heat source. However, the typical PCM (e.g., hyrdrated salt, etc.) is a very poor heat conductor such that there will not be much heat transfer along the length of PCM 392, especially in a prior art arrangement wherein heat pipe fluid 388 is not present.

As PCM 392 absorbs heat from heat pipe fluid 388, it liquefies. As PCM 392 melts, the temperature of heat pipe fluid 388 will plateau. If and when all of PCM 392 melts, the temperature of heat pipe fluid 388 will begin rising again. In preferred embodiments, a sufficient amount of PCM 392 is present in outer chamber 390 so that the PCM never completely melts.

If the temperature of heat pipe fluid 388 never reaches the phase change temperature of PCM 392, then no heat storage will occur in the PCM. In such a case, passive thermal system 370 behaves like a conventional heat pipe.

Once satellite electronics 401 stops generating significant quantities of heat, and to the extent that PCM 392 has stored (via the latent heat of fusion), the PCM slowly releases the stored heat back into heat pipe fluid 388 in chamber 386. The heat pipe fluid then exchanges heat with radiator 402, where it is radiated to space.

Thus, PCM 392 is analogous to a large capacitor, storing energy until it can be released to ground. And it provides a safety net, ready to damp any temperature rise of heat pipe fluid 388, preventing the fluid from exceeding temperature limitations.

It is to be understood that the disclosure describes a few embodiments and that many variations of the invention can easily be devised by those skilled in the art after reading this disclosure and that the scope of the present invention is to be determined by the following claims.

What is claimed:

1. An apparatus comprising a passive thermal system, the passive thermal system comprising:
  a housing, wherein the housing comprises:
  an outer wall;
  an inner wall having a plurality of fins projecting toward the outer wall;
  an outer chamber defined between the inner wall and the outer wall, the plurality of fins projecting into the outer chamber and there being a gap between a tip of each of the plurality of fins and the outer wall;
  an inner chamber circumscribed by the inner wall, wherein the inner wall further comprises a plurality of projections extending into the inner chamber;
  heat pipe working fluid contained in the inner chamber, wherein the heat pipe working fluid is configured to pass from a first liquid state to a vapor state when a heat source provides a first heat to the inner chamber; and
  phase change material (PCM),
  wherein the PCM is contained in the outer chamber, and wherein the PCM is configured to pass from a solid state to a second liquid state when the heat pipe working fluid in the vapor state provides, via the plurality of fins, a second heat to the outer chamber.

2. The apparatus of claim 1, wherein the apparatus is a satellite, and further comprising:
   satellite electronics, wherein the satellite electronics are thermally coupled to the outer wall at a first end of the housing, and the heat source comprises the satellite electronics; and
   a satellite radiator panel, wherein the satellite radiator panel is thermally coupled to the outer wall at a second end of the housing and the satellite radiator panel is configured to radiate a third heat from the PCM to space when the PCM passes from the second liquid state to the solid state.

3. The apparatus of claim 1 and further wherein each of the plurality of fins tapers from a relatively greater width proximal to the inner wall to a relatively lesser width distal from the inner wall.

4. The apparatus of claim 1 and further wherein the fins project at least forty percent of distance to the outer wall.

5. The apparatus of claim 1 and further wherein each of the plurality of fins extend along a length of the inner wall from a first end of the housing to a second end of the housing.

6. The apparatus of claim 1 and further wherein the inner chamber and the outer chamber have a first same length, and the inner wall and the outer wall have substantially a second same length.

7. The apparatus of claim 1 and further wherein the housing has a semi-cylindrical form that is defined, in part, by a curved portion of the outer wall.

8. The apparatus of claim 7 and further wherein the outer wall further comprises a flat portion.

9. The apparatus of claim 8 and further comprising a first interface material, wherein the first interface material abuts the flat portion of the outer wall at a first end of the housing and is configured to couple the passive thermal system to the heat source.

10. The apparatus of claim 9 and further comprising a second interface material, wherein the second interface material abuts the flat portion of the outer wall at a second end of the housing and is configured to couple the passive thermal system to a heat sink.

11. The apparatus of claim 1 and further wherein the outer chamber has a u-shaped lateral cross section.

12. The apparatus of claim 1 and further wherein the inner chamber is cylindrical.

13. The apparatus of claim 1 and further wherein a portion of the inner wall is integral with the outer wall.

14. An apparatus comprising a passive thermal system, the passive thermal system comprising:
   a housing, wherein the housing comprises:
   an outer wall and an inner wall, a region therebetween defining an outer chamber;
   a plurality of fins projecting from an outward-facing surface of the inner wall into the outer chamber and there being a gap between a tip of each of the plurality of fins and the outer wall;
   a plurality of projections extending from an inward-facing surface of the inner wall into an inner chamber that is circumscribed by the inner wall;
   heat pipe working fluid contained in the inner chamber, and
   phase change material (PCM),
   wherein the PCM is contained in the outer chamber,
   wherein the heat pipe working fluid is configured to pass from a first liquid state to a vapor state when a heat source provides a first heat to the inner chamber, and
   wherein the PCM is configured to pass from a solid state to a second liquid state when the heat pipe working fluid in the vapor state provides, via the plurality of fins, a second heat to the outer chamber.

15. The apparatus of claim 14 and further wherein the inner chamber is cylindrical and the outer chamber has a u-shaped lateral cross section.

16. The apparatus of claim 14 and further the outer wall has a physical adaptation for thermally coupling to all to the heat source at a first end of the housing and for thermally coupling to a heat sink at a second end of the housing.

17. The apparatus of claim 16 and further wherein the physical adaptation comprises a flat portion of the outer wall.

18. The apparatus of claim 14 and further wherein a portion of the inner wall is integral with the outer.

19. The apparatus of claim 14 wherein the apparatus is a satellite, the apparatus further comprising:
   satellite electronics, wherein the satellite electronics are thermally coupled to the outer wall at a first end of the housing, and the heat source comprises the satellite electronics; and
   a satellite radiator panel, wherein the satellite radiator panel is thermally coupled to the outer wall at a second end of the housing, and the satellite radiator panel is configured to radiate to space a third heat from the PCM when the PCM passes from the second liquid state to the solid state.

20. The apparatus of claim 14 and further wherein each of the plurality of fins tapers from a relatively greater width proximal to the inner wall to a relatively lesser width distal from the inner wall.

* * * * *